(No Model.)
P. S. SOWERS.
SANITARY MUFFLE FOR VESSELS.
No. 349,010. Patented Sept. 14, 1886.
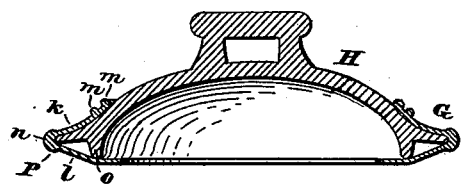
Fig. 2.
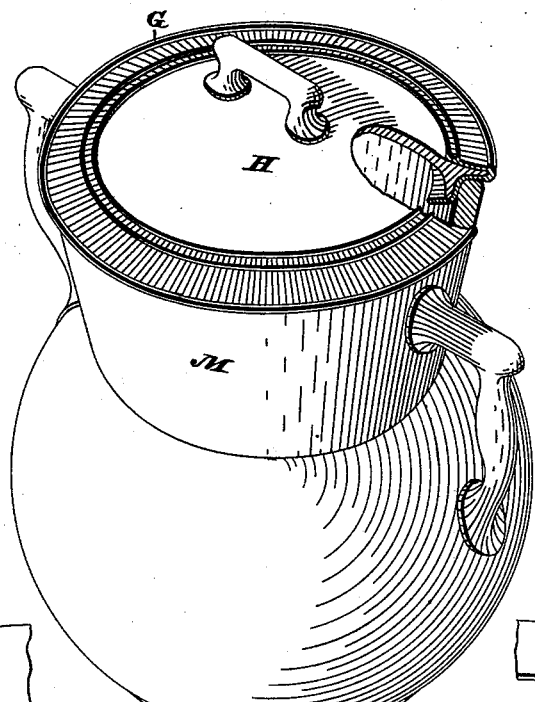
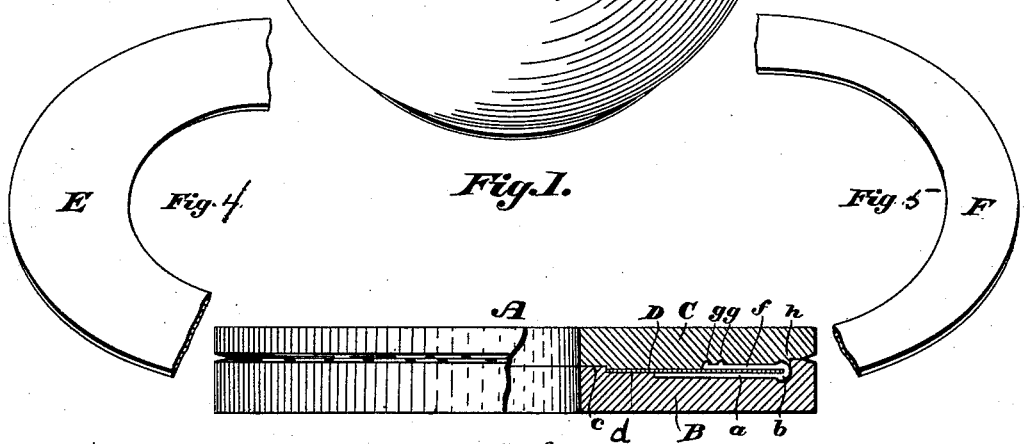
Fig. 1. Fig. 3. Fig. 4. Fig. 5.
WITNESSES:
Harry Frease
Chas. R. Miller
INVENTOR
Percy S. Sowers
BY
W. K. Miller
ATTORNEY
N. PETERS, Photo-Lithographer, Washington, D. C.

UNITED STATES PATENT OFFICE.

PERCY S. SOWERS, OF CANTON, OHIO.

SANITARY MUFFLE FOR VESSELS.

SPECIFICATION forming part of Letters Patent No. 349,010, dated September 14, 1886.

Application filed March 5, 1886. Serial No. 194,117. (No model.)

*To all whom it may concern:*

Be it known that I, PERCY S. SOWERS, a citizen of the United States, and a resident of Canton, county of Stark, State of Ohio, have invented a new and useful Improvement in Sanitary Muffles for Vessels, of which the following is a full, clear, and exact description, reference being had to the accompanying drawings, making part of this specification.

My invention relates to improvements in sanitary muffles for vessels; and it consists of the hereinafter-described rubber muffle for use on the lids of vessels, to prevent noise and breakage and the escape of nocuous odors or gases.

My invention further consists in the detail and combination of parts, as set forth in the claim.

Similar letters of reference indicate corresponding parts in the drawings hereunto attached.

Figure 1 is a view of a vessel and lid with section of lid removed, showing the muffle between the lid and the edge of the vessel. Fig. 2 is a sectional view of the lid shown in Fig. 1, in which is shown the position of the muffle before placing on the vessel. Fig. 3 is a view of the mold, sectional in part, showing the rubber in the mold. Figs. 4 and 5 represent sections of the rubber rings.

A, Fig. 4, represents the mold; B, the bottom plate, of such diameter as may be required for a given size of muffle, and about one inch thick. In this plate a recess or depression, $a$, is formed, having around its outer edge a groove, $b$, semicircular in form. About the center of this plate is a hub, $c$. A thin metal plate, D, is adapted to said hub, resting on a shoulder, $d$, projected out and over the depression $a$ to a point about three thirty-seconds of an inch inside of the periphery of the mold. The upper plate, C, is adapted to the center hub, $c$, and further adapted to rest on the plate B. Plate C is further provided with a depression, $f$, having grooves $g$ $g$ and $h$, the latter to conform to the groove or depression $b$ in plate B. A ring of soft rubber, of which E, Fig. 5, represents a section, may be placed in the recess $a$, upon the top of which is placed the thin metal plate D, upon which plate may be placed a soft-rubber ring, F, a section of which is shown by Fig. 6. This ring may be about two-thirds of the width of the ring E. The thickness of the rings may be determined to some extent by the density required in the muffle. The plate C may now be placed upon plate B, completing the mold, with the rubber therein, to be clamped and vulcanized by any of the well-known and approved methods. To this described mold may be added such depressions of figures for ornamentation or numbers as may be desired, and to the plastic rubber such ingredients as may be well known, to produce such tint of color as may be preferable. By this process is formed a rubber muffle, G, as shown in Fig. 1, adapted to embrace the lid H of a vessel, as shown in Fig. 1, having an upward and inwardly projected flange, $k$, and a downward and inwardly projected flange, $l$, the flange $k$ provided with ribs or beads $m$ $m$, to strengthen the edge of the flange and to hold it firmly against the top of the lid H. Said flanges are united at $n$, at which point there is a re-enforcement or thickness of the rubber forming a peripheral bead or rim to strengthen the muffle at a point where it is the most likely to be injured by tension about the edge of the lid, and to prevent noise and breakage by accidental contact with the vessel. The lower flange, $l$, is projected from the bead $n$ down and under the downwardly-projected rim $o$ of the lid, thereby forming a cushion that, when the lid is placed on the vessel M, will conform to the irregularities of diameter and inequalities of surface of the mouth of the vessel, as shown in Fig. 1, and by reason of this adaptation will prevent the escape from the vessel of nocuous and hurtful odors or gases.

What I claim as new, and desire to secure by Letters Patent, is—

The combination, with a cover or lid having a downwardly-projecting rim, $o$, of the muffle consisting, essentially, of two flat rubber bands joined at their outer edges, the upper section or ring of said muffle resting on the outer edge of the surface of the lid or cover, and the lower section passing in a straight line from the outer edge of the cover or lid down under the rim $o$, forming a cushion, substantially as set forth.

In testimony whereof I have hereunto set my hand this 3d day of March, A. D. 1886.

PERCY S. SOWERS.

Witnesses:
W. K. MILLER,
CHAS. R. MILLER.